(12) United States Patent
Jin et al.

(10) Patent No.: US 7,933,364 B2
(45) Date of Patent: Apr. 26, 2011

(54) QAM SYMBOL SLICING METHOD AND APPARATUS

(75) Inventors: Eun Sook Jin, Daejeon (KR); Yun Jeong Song, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/473,051

(22) Filed: May 27, 2009

(65) Prior Publication Data

US 2009/0232255 A1    Sep. 17, 2009

Related U.S. Application Data

(63) Continuation of application No. PCT/KR2007/006135, filed on Nov. 30, 2007.

(30) Foreign Application Priority Data

Dec. 8, 2006 (KR) .......... 10-2006-0124289
Apr. 11, 2007 (KR) .......... 10-2007-0035521

(51) Int. Cl.
*H04L 27/06* (2006.01)
(52) U.S. Cl. ...................................... 375/340
(58) Field of Classification Search .......... 375/316, 375/340, 261; 329/304, 305
See application file for complete search history.

(56) References Cited

U.S. PATENT DOCUMENTS

| 5,263,018 | A | 11/1993 | Christopher |
| 5,471,508 | A | 11/1995 | Koslov |
| 6,661,849 | B1 * | 12/2003 | Guo et al. ............. 375/261 |
| 2007/0189231 | A1 * | 8/2007 | Chang et al. .......... 370/335 |

* cited by examiner

*Primary Examiner* — Tesfaldet Bocure
(74) *Attorney, Agent, or Firm* — Staas & Halsey LLP

(57) ABSTRACT

A method for slicing a symbol in a QAM digital demodulator, includes acquiring a digital integer value by sampling a symbol signal in an in-phase coordinate or a quadrature-phase coordinate; and extracting a symbol bit sequence in the in-phase coordinate or the quadrature-phase coordinate from a whole bit sequence of the digital integer value by using an LSB thereof. Further, a symbol slicer for detecting a QAM symbol, includes digital sampling units, each of which acquires a digital integer value by sampling a symbol signal in an in-phase coordinate or a quadrature-phase coordinate; and a symbol bit sequence extracting unit that extracts a symbol bit sequence in the in-phase coordinate or the quadrature-phase coordinate from a whole bit sequence of the digital integer value by using an LSB thereof.

14 Claims, 5 Drawing Sheets

QAM SYMBOL SLICING METHOD AND APPARATUS

This application is a continuation application of PCT international application serial number PCT/KR2007/006135 filed on Nov. 30, 2007, which is designated the United States.

CROSS-REFERENCE(S) TO RELATED APPLICATION(S)

The present invention claims priority of Korean Patent Application No. 10-2006-0124289, filed on Dec. 8, 2006, and Korean Patent Application No. 10-2007-0035521, filed on Apr. 11, 2007, which are incorporated herein by references.

FIELD OF THE INVENTION

The present invention relates to a digital demodulator and a method of detecting a digital signal; and more particularly, to a symbol slicer and symbol slicing method for use in a Quadrature Amplitude Modulation (QAM) scheme.

BACKGROUND OF THE INVENTION

"Quadrature Amplitude Modulation (QAM)" refers to a kind of digital modulation scheme in which symbols are arranged in a lattice form with a specific interval in a signal constellation to determine a magnitude and a phase of a transmission signal, wherein the signal constellation has two axes that represent an in-phase (I) coordinate and a quadrature-phase (Q) coordinate, respectively. A QAM symbol slicer (hereinafter, simply referred to as "QAM slicer"), which serves as an element of a QAM demodulator, extracts an I-component bit sequence and a Q-component bit sequence from a symbol signal that has been QAM-demodulated at a receiving end.

FIG. 1 illustrates a signal constellation used for a conventional 16QAM scheme, which is an example of QAM scheme. In general, as shown therein, a QAM signal constellation includes symbol positions regularly arranged with a specific interval with respect to an I axis and a Q axis such that the coordinates of the symbol positions in the I and Q axes are given as $\pm(2n-1)$, wherein n is an integer.

FIG. 2 is a flow chart for illustrating a bit sequence extraction in a conventional QAM slicer used for a conventional QAM having a signal constellation shown in FIG. 1. Referring to FIG. 2, the conventional QAM slicer compares an I or Q component of each symbol signal to a plurality of boundary values of symbol positions in the signal constellation. Although the comparison is performed in a sequential manner in FIG. 2, it can also be performed in a parallel manner. Thereafter, the conventional QAM slicer detects a symbol position closest to the symbol signal, which has been demodulated at the receiving end, in the signal constellation; and extracts two bit sequences that are represented by the symbol signal in the I and Q axes, respectively. Having acquired the bit sequences in this manner, the symbol now can be detected by combining the two bit sequences.

However, the above method of bit sequence extraction by the conventional QAM slicer has a drawback of a high hardware complexity, because, for identifying a single symbol, the I and Q components thereof need to be compared to a plurality of boundary values. Specifically, when the order of QAM modulation increases as 64, 256 and 1024, the number of boundary values to be compared increases greatly, thereby increasing the complexity and aggravating a difficulty in the implementation of the hardware.

In addition to this, the conventional QAM slicer is limited in scalability in that, in accordance with the conventional method, a slicer structure used for a 128QAM scheme cannot be applied to a 256QAM scheme for example.

To solve the above problems, the present invention is to provide an improved symbol slicer and an improved symbol slicing method capable of reducing the hardware complexity while achieving the scalability (i.e., being applicable even if the order of QAM modulation is increased or decreased).

SUMMARY OF THE INVENTION

In view of the foregoing, the present invention provides a scalable QAM slicing method capable of reducing the hardware complexity of a QAM digital demodulator while applicable even if the order of QAM modulation is increased or decreased; and a QAM slicer for implementing the method.

In accordance with one aspect of the present invention, there is provided a method for slicing a symbol in a QAM digital demodulator, including acquiring a digital value by sampling a symbol signal in an in-phase coordinate or a quadrature-phase coordinate; and extracting a symbol bit sequence in the in-phase coordinate or the quadrature-phase coordinate from the digital value by using an LSB of an integer value thereof.

It is preferable that, in extracting the symbol bit sequence, the LSB is set to be a predetermined value that stands for a region where the digital value belongs. In this case, the predetermined value may be "1".

Further, it is preferable that said extracting includes combining bits of the digital value except for the LSB with a resulting value of a logical OR operation between the LSB and an inverted value of the LSB to output the symbol bit sequence.

In accordance with another aspect of the present invention, there is provided a symbol slicer for detecting a QAM symbol, including: digital sampling units, each of which acquires a digital value by sampling a symbol signal in an in-phase coordinate or a quadrature-phase coordinate; and a symbol bit sequence extracting unit that extracts a symbol bit sequence in the in-phase coordinate or the quadrature-phase coordinate from the digital value by using an LSB of an integer value thereof.

BRIEF DESCRIPTION OF THE DRAWINGS

The features of the present invention will become apparent from the following description of preferred embodiments given in conjunction with the accompanying drawings, in which.

DETAILED DESCRIPTION OF THE EMBODIMENTS

Figure 1:
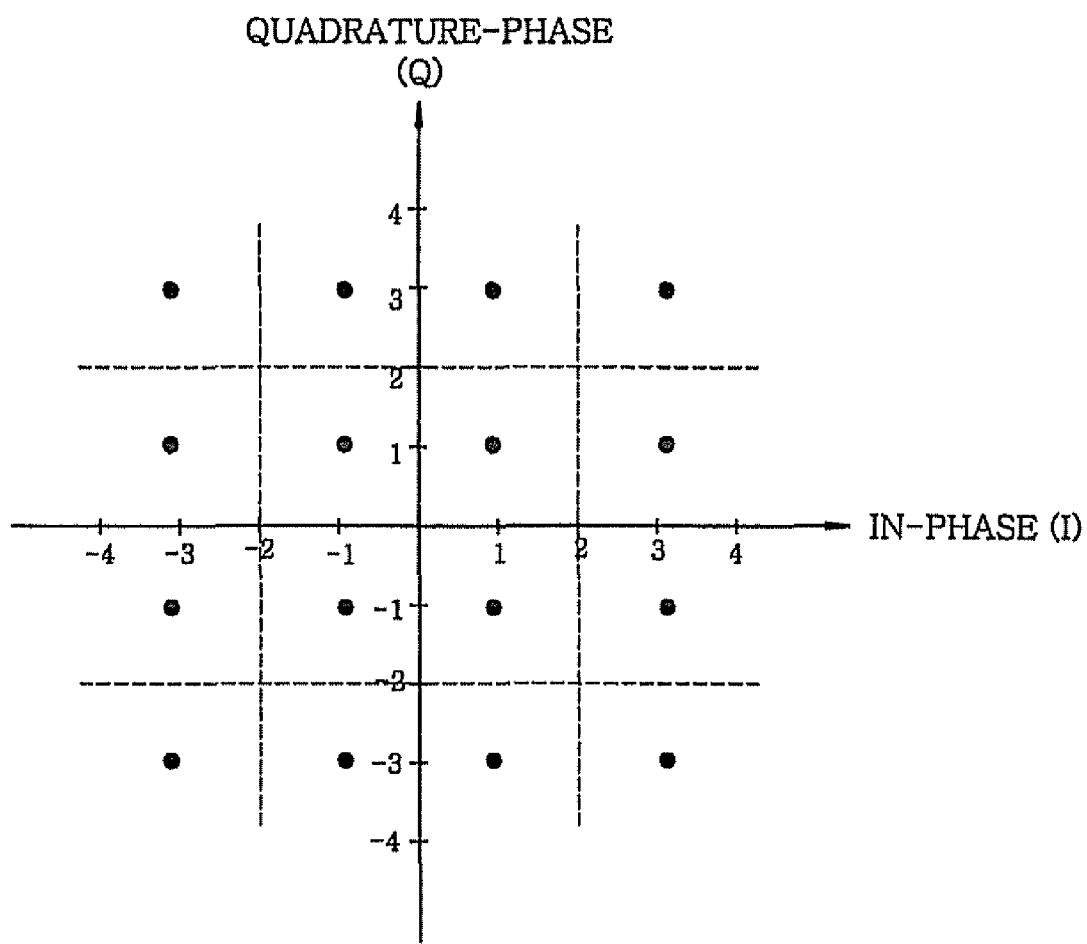
FIG. 1 is a diagram illustrating a signal constellation used for a conventional 16QAM scheme.

Hereinafter, embodiments of the present invention will be described in detail with reference to the accompanying drawings, which forms a part hereof. For convenience, the following description will be made on the basis of a 16QAM symbol signal with a signal constellation shown in FIG. 1. However, it should be apparent to those skilled in the art that the scope of the present invention is not limited thereto.

Figure 3:
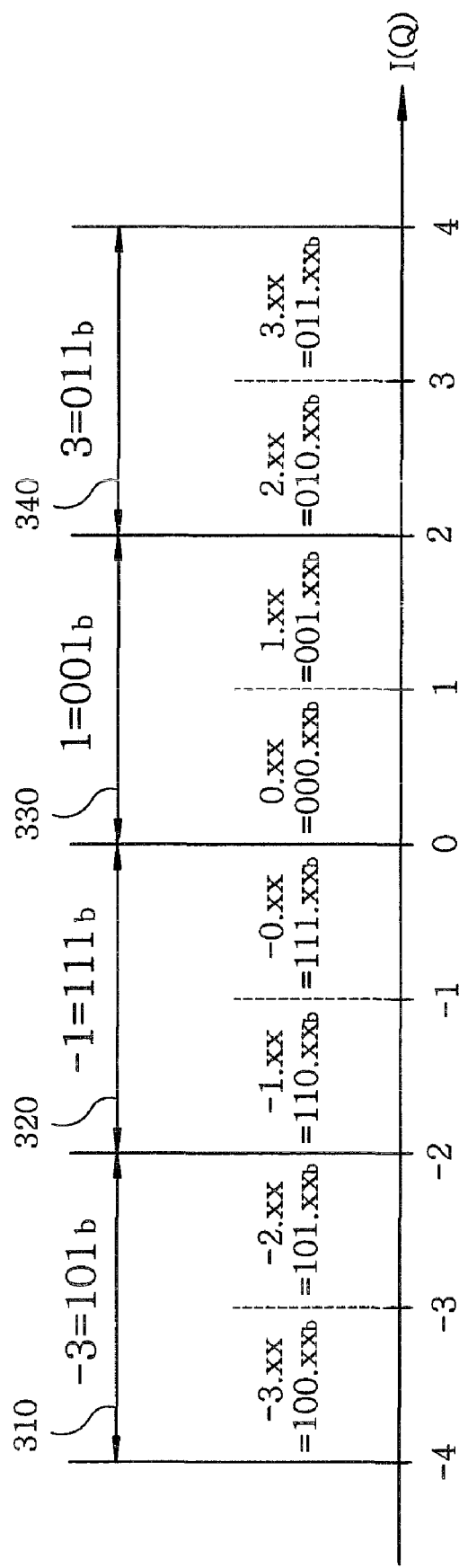
FIG. 3 is a diagram that shows digital expressions of I and Q coordinates in the signal constellation shown in FIG. 1 to describe a symbol slicing method in accordance with an embodiment of the present invention.

FIG. 3 is a diagram for illustrating digital expressions of the I or Q coordinate in the signal constellation in accordance with an embodiment of the present invention.

As shown therein, the I or Q coordinate in the signal constellation has determination regions for respective symbols. In specific, if a coordinate of a symbol signal belongs to a region 310 in the I or Q axis, a symbol slicer in accordance with the present embodiment of the invention determines that a representative bit sequence of the symbol signal is "$101_b$." Likewise, the symbol slicer extracts representative bit sequences of "$111_b$", "$001_b$", and "$011_b$" from symbol signals, each being located in a region 320, 330 and 340.

In the regions 310 to 340 in FIG. 3, digital real-number values of the symbol signals are respectively expressed as follows: "$100.xx_b$" in a lower half of the region 310 and "$101.xx_b$" in an upper half of the region 310; "$110.xx_b$" in a lower half of the region 320 and "$111.xx_b$" in an upper half of the region 320; "$000.xx_b$" in a lower half of the region 330 and "$001.xx_b$" in an upper half of the region 330; and "$010.xx_b$" in a lower half of the region 340 and "$011.xx_b$" in an upper half of the region 340, wherein "xx" represents a fractional-part value.

As can be seen therefrom, if two symbol signals are located in different parts within a same region, two upper bits of an integer part in the digital real-number value of one of the symbol signals are identical to those of the other symbol signal, but LSBs of the integer parts in the digital real-number values of the two symbol signals are different from each other. Herein, the two upper bits of a symbol signal are equal to two upper bits of a representative bit sequence that represents a region where the symbol signal belongs. Further, an LSB of the representative bit sequence that stands for each of the regions is a predetermined value (which is "1" in case of FIG. 3). The symbol slicing method in accordance with the present embodiment of the invention is derived from the above-described feature. Specifically, in the present embodiment, an integer part (which does not include a fractional part) is extracted from a digital real-number value of each coordinate of a symbol signal, and then an LSB thereof is always set as the predetermined value ("1") in a bit sequence to be output.

Figure 2:
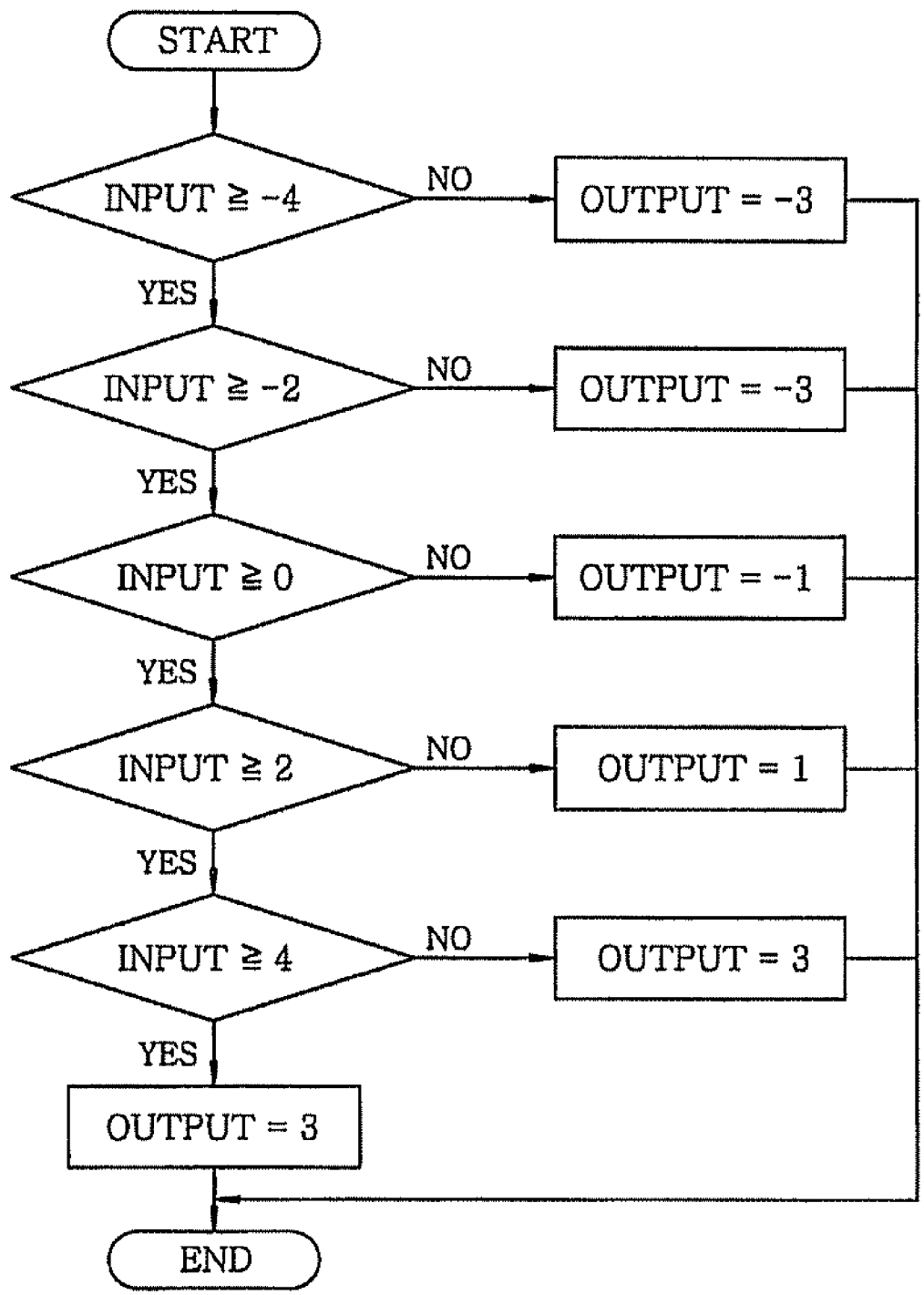
FIG. 2 is a flow chart for illustrating a conventional method for slicing a symbol signal with respect to the I and Q coordinates in the signal constellation shown in FIG. 1.

In the conventional symbol slicing method shown in FIG. 2, the comparison operation between the symbol signal component and the boundary values had to be performed, e.g., five times at worst. However, the bit sequence extraction in accordance with the present embodiment does not need such comparison operation, and can be performed with a region the symbol signal belongs to. Further, the computational complexity of the method is pursuant to $O(\sqrt{n})$, whereas that of the conventional method is pursuant to $O(1)$. Therefore, compared to the conventional symbol slicing method that requires a number of comparison operations, the present invention has an effect of greatly reducing a total amount of calculation while enhancing the scalability as well.

As described above, the axis shown in FIG. 3 can be the in-phase axis or the quadrature-phase axis. Therefore, to detect a symbol signal by the symbol slicer in accordance with the present invention, the above-described procedure is performed for each of the I and Q components of the symbol signal, thus extracting two symbol bit sequences for the I and Q components, and combining the extracted symbol bit sequences. Since, in accordance with the present embodiment, a demodulator may be configured by the symbol slicer that uses only a digital integer value of a symbol signal without a comparator, a structure of the demodulator can be simplified and the hardware cost can be saved compared to the prior art.

Figure 4:
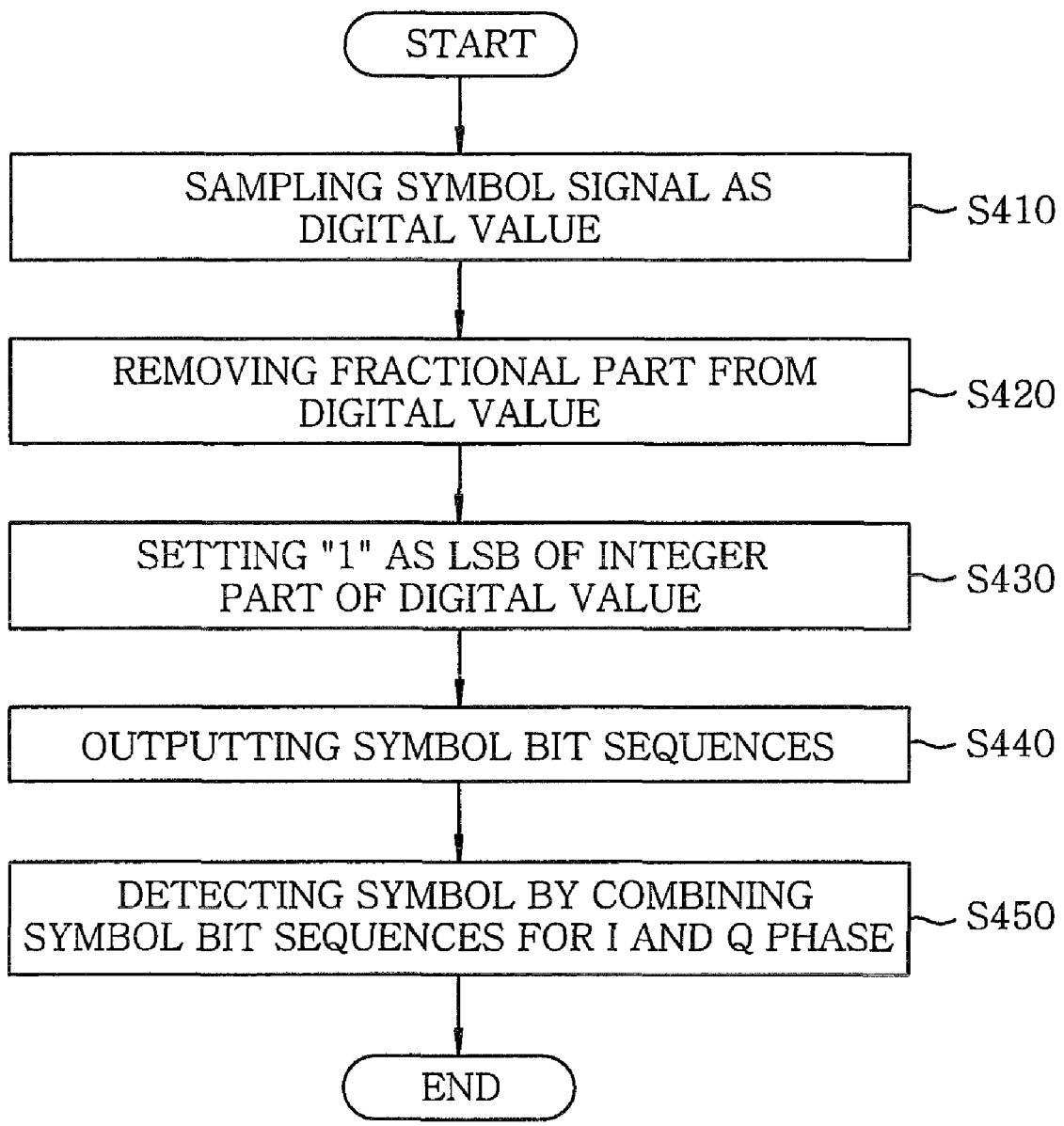
FIG. 4 is a flow chart for illustrating a symbol slicing method in accordance with the embodiment of the present invention.

FIG. 4 is a flow chart for illustrating the symbol slicing method in accordance with the embodiment of the present invention. The symbol slicing method shown therein is performed by a symbol slicer shown in FIG. 5.

In Step 410 of FIG. 4, symbol signals output from a digital demodulator 510 is sampled as digital values, wherein each of the digital values represents a real number with an integer part and a fractional part.

In Step 420, the integer part is separated from the digital value by eliminating the fractional part therefrom. Thus separated integer part is basically used for the subsequent steps for extracting bit sequences.

In the above description, the procedure for acquiring the integer part is divided into two steps (i.e., Steps 410 and 420). However, this procedure may also be performed as a single step for a simpler implementation. Specifically, the integer part can be sampled directly in the step of sampling the symbol signal. However, in this case, it may be required to configure a sampling circuit capable of acquiring the integer part not by, e.g., indifferently applying rounding toward zero, rounding to even or rounding away from zero.

Figure 5:
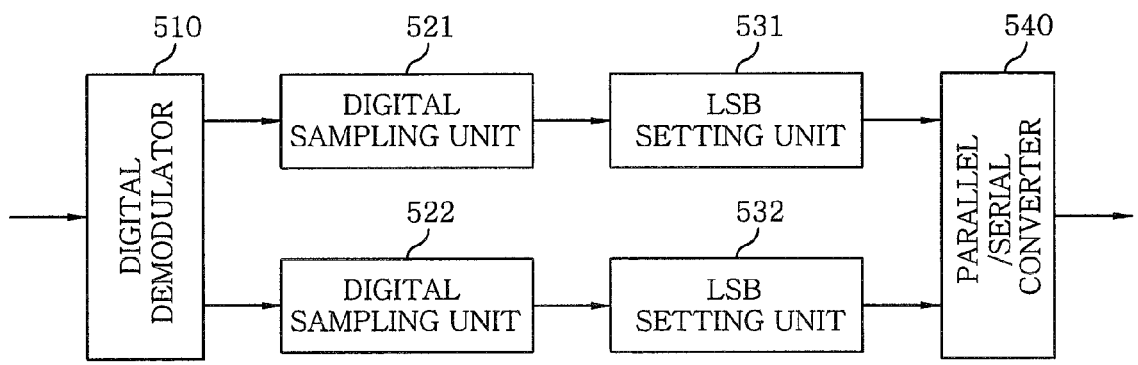
FIG. 5 is a block diagram illustrating a configuration of a symbol slicer in accordance with the embodiment of the present invention.

Steps 410 and 420 are performed by digital sampling units 521 and 522 shown in FIG. 5. That is, the digital sampling units 521 and 522 separate integer parts from the I and Q components of a symbol signal, respectively.

The digital sampling units 521 and 522 are provided respectively for the I and Q components of the symbol signal. The two components of the symbol signal are output from the digital demodulator 510. The digital demodulator 510 demodulates a symbol signal received in an analog waveform to output an original digital signal.

Next, in Steps 430 and 440, symbol bit sequences are acquired by using the integer parts acquired in Step 420. In Step 430, an LSB of the integer part is set to be a predetermined value such as "1". In this case, if the LSB of the integer part of the symbol signal is originally equal to the predetermined value (e.g., "1"), the LSB does not need to be changed. However, if the LSB is not equal to the predetermined value (e.g., "1"), the LSB value is changed to the predetermined value (e.g., "1"), and thus changed LSB is output. For simplicity in implementation, it is also possible to configure the hardware such that an LSB is always set to be the predetermined value (e.g., "1") without checking whether the LSB is originally "1" or "0" to save a supplementary circuit therefor.

Thereafter, in Step 440, the symbol bit sequences acquired as described above is output to be used for symbol detection.

The Steps 430 and 440 are performed by LSB setting units 531 and 532 shown in FIG. 5. Each of the LSB setting units 531 and 532 receives the digital value including the integer part separated by the digital sampling units 521 and 522 for the I component and the Q component, respectively. Then, each of the LSB setting units 531 and 532 sets an LSB of the received integer part to be a value equal to an LSB of a representative bit sequence that stands for a region where the received digital value belongs.

Figure 6:
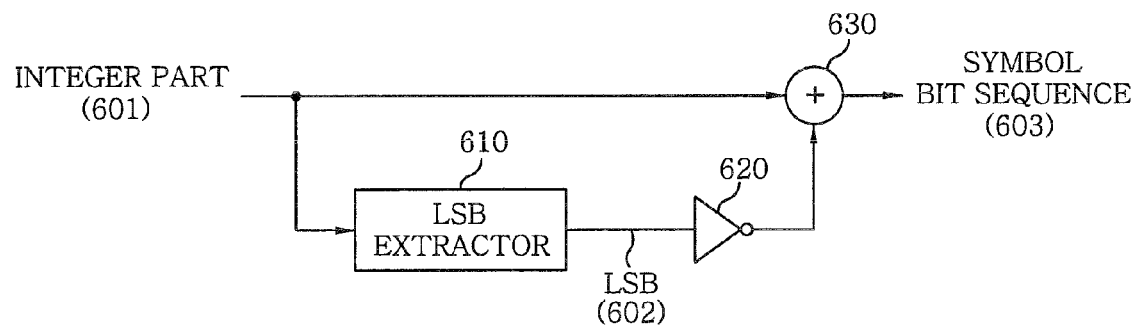
FIG. 6 is a diagram illustrating an example of a logic circuit that constitutes a Least Significant Bit (LSB) setting unit shown in FIG. 5.

FIG. 6 illustrates an example of a logic circuit included in each of the LSB setting units 531 and 532. The logic circuit shown in FIG. 6 is a hardware implementation of the above-described operations with a simple configuration. An LSB extractor 610 receives an integer part 601, and extracts therefrom an LSB 602. The LSB 602 is input to a logic inverter 620, which converts "0" into "1" and vice versa. An OR logic operator 630 receives thus inverted LSB together with the integer part 601, and performs a logical OR operation between the LSB of the integer part 601 and the inverted LSB to thereby output a symbol bit sequence 603 in which the LSB of the integer part 601 is replaced by a resulting value of the logical OR operation. That is, in the OR logic operator 630, if an LSB of an input bit sequence is "0", the LSB is logically ORed with the inverted bit "1" and is changed to "1"; however, if the LSB of the input bit sequence is "0", the LSB is logically ORed with the inverted bit "1" and is maintained to be "1".

In other words, the logic circuit shown in FIG. 5 creates the symbol bit sequence 603 by combining the bits of the integer part except for its LSB with the resulting value of the logical OR operation.

A final Step S450 is a supplementary step. In Step S450, two symbol bit sequences extracted respectively for the I and Q coordinates in Steps 410 to 440 are combined, whereby the received symbol is detected.

The Step 450 is performed by a parallel/serial converter 540 shown in FIG. 5. The parallel/serial converter 540 receives two bit sequences that represent symbol signals in the I and Q axes, respectively. Then, the parallel/serial converter 540 combines the two received bit sequences, detects the symbol signal transmitted by a transmission end, and converts the detected symbol signal into a serial signal.

In the above, the description has been made on the assumption that the extracted symbol bit sequences are expressed in the form of 2's complement. However, the slicer using a digital integer value of a symbol signal without a comparator in accordance with the present embodiment may also be configured such that the symbol bit sequences are expressed in a different form (e.g., Gray code).

As an example of such configuration of the present embodiment, a case of adapting 3-bit Gray code will be briefly described below. Eight integers encoded by 3-bit Gray code can be expressed as "$000_b$", "$001_b$", "$011_b$", "$010_b$", "$110_b$", "$111_b$", "$101_b$", and "$100_b$". As can be seen above, two consecutive integers within a same region differ only in LSBs. In this case, an LSB of a representative symbol bit sequence that stands for the two consecutive integers may be determined based on two upper bits thereof, and does not have to be always "1". For example, the LSB of the representative symbol bit sequence may be obtained by an XOR (exclusive OR) operation between the two upper bits.

The symbol slicing method in accordance with the present invention may be realized in a form of a computer program that can be executed by various kinds of computers by being recorded in a computer-readable medium. The computer-readable medium may include a program, a data file, a data structure or the like singly or in combination. The program recorded in the medium may be specially designed for the present invention or may be already known to and available by those skilled in the computer industry. The computer readable recording medium may be magnetic media such as hard disk, floppy disk and magnetic tape; optical media such as Compact Disk-Read Only Memory (CD-ROM) and Digital Versatile Disk (DVD); magneto-optical media such as floptical disk; and a variety of semiconductor memory devices for storing and executing a program such as Read-Only Memory (ROM), Random Access Memory (RAM) and flash memory.

The media may also be a transmission media such as an optical fiber, a metal line or a waveguide for transmitting a carrier signal that represents a program, a data structure and the like. The program may be coded by a machine language code using, e.g., an assembly or a compiler or a high-level language that is computer-executable by an interpreter or the like. Further, the hardware may be configured to operate as one or more software modules for performing the operations in the method of the present invention, and vice versa.

As described above, the QAM slicing method in accordance with the present invention can reduce a hardware complexity of a digital demodulator, and provide a scalable QAM slicer used for the digital demodulator.

Specifically, in accordance with the present invention, a QAM slicer can be implemented with a great simplicity by using a logical operation involving an integer part and an LSB of a sampling signal that has been sampled as a digital values in I or Q axis, thereby reducing a hardware complexity of a digital demodulator. Further, thus configured QAM slicer has a great advantage with regard to the hardware size, the cost, the processing speed, and the scalability over a conventional QAM slicer.

While the invention has been shown and described with respect to the preferred embodiments, it will be understood by those skilled in the art that various changes and modifications may be made without departing from the scope of the invention as defined in the following claims.

What is claimed is:

1. A method for slicing a symbol in a QAM digital demodulator, comprising:
    acquiring a digital value by sampling a symbol signal in an in-phase coordinate or a quadrature-phase coordinate; and
    extracting a symbol bit sequence in the in-phase coordinate or the quadrature-phase coordinate from the digital value by using an LSB of an integer value thereof, thereby slicing the symbol and transforming the symbol signal into the coordinate for the QAM digital demodulator.

2. The method of claim 1, wherein, in extracting the symbol bit sequence, the LSB of the whole bit sequence is set to be a predetermined value that stands for a region where the digital value belongs.

3. The method of claim 2, wherein the predetermined value is "1".

4. The method of claim 1, wherein said extracting includes:
    combining bits of the digital value except for the LSB with a resulting value of a logical OR operation between the LSB and an inverted value of the LSB to output the symbol bit sequence.

5. The method of claim 1, wherein said acquiring includes:
    sampling the symbol signal in a form of a digital real-number value that has the integer part and a fractional part; and
    obtaining the integer value by eliminating the fractional part from the digital real-number value.

6. The method of claim 1, wherein the integer value is expressed by 2's complement.

7. A QAM digital demodulation method comprising:
    detecting a received symbol by combining an in-phase bit sequence and a quadrature-phase bit sequence extracted by the method of claim 1, wherein the in-phase bit sequence is extracted from the symbol signal in the in-phase coordinate, and the quadrature-phase bit sequence is extracted from the symbol signal in the quadrature-phase coordinate.

8. A symbol slicer for detecting a QAM symbol, comprising:

digital sampling units, each of which acquires a digital value by sampling a symbol signal in an in-phase coordinate or a quadrature-phase coordinate; and a symbol bit sequence extracting unit that extracts a symbol bit sequence in the in-phase coordinate or the quadrature-phase coordinate from the digital value by using an LSB of an integer part thereof, thereby slicing the symbol and transforming the symbol signal into the coordinate for a QAM digital demodulator.

9. The symbol slicer of claim 8, wherein the symbol bit sequence extracting unit sets the LSB to be a predetermined value that stands for a region where the digital value belongs.

10. The symbol slicer of claim 9, wherein the predetermined value is "1".

11. The symbol slicer of claim 9, wherein the symbol bit sequence extracting unit includes:

a logic circuit that combines bits of the digital value except for the LSB with a resulting value of a logical OR operation between the LSB and an inverted value of the LSB to thereby output the symbol bit sequence.

12. The symbol slicer of claim 8, wherein the integer value is expressed by 2's complement.

13. The symbol slicer of claim 8, wherein the digital sampling units sample the symbol signal in a form of a digital real-number value that has an integer part and a fractional part, and obtains the integer value by eliminating the fractional part from the digital real-number value.

14. A QAM digital demodulator that detects a received symbol by combining an in-phase bit sequence and a quadrature-phase bit sequence extracted by the symbol slicer of claim 8, wherein the in-phase bit sequence is extracted from the symbol signal in the in-phase coordinate, and the quadrature-phase bit sequence is extracted from the symbol signal in the quadrature-phase coordinate.

* * * * *